INVENTOR.
Henry F. Dunlap
Ellis W. Shuler, Jr.
Lloyd E. Gourley, Jr.
Attorney

Feb. 19, 1957 E. W. SHULER, JR., ET AL 2,782,364
METHOD AND APPARATUS FOR LOCATING DISPLACEABLE
OIL IN SUBTERRANEAN FORMATIONS
Filed Oct. 27, 1952 2 Sheets-Sheet 2

ATTEST
Clarence R. Patty, Jr.

INVENTOR.
Henry F. Dunlap
Ellis W. Shuler, Jr.
BY Lloyd E. Gourley, Jr.

Norbert E. Birch
Attorney

United States Patent Office 2,782,364
Patented Feb. 19, 1957

2,782,364

METHOD AND APPARATUS FOR LOCATING DISPLACEABLE OIL IN SUBTERRANEAN FORMATIONS

Ellis W. Shuler, Jr., and Henry F. Dunlap, Dallas, Tex., and Lloyd E. Gourley, Jr., Socorro, N. Mex., assignors to The Atlantic Refining Company, Philadelphia, Pa., a corporation of Pennsylvania Application October 27, 1952, Serial No. 317,102

13 Claims. (Cl. 324—1)

This invention relates to logging of boreholes drilled through subterranean formations, and more particularly to the logging of such boreholes to determine the existence in any of the formations of hydrocarbons which are capable of being displaced by mud filtrate and are therefore recoverable.

An ever present problem which faces the oil industry in the drilling of wells, and more particularly in the drilling of exploratory wells, is the danger of drilling through oil or gas bearing formations without being aware of that fact. Much work has been done toward providing apparatus and methods for examining formations penetrated by boreholes in an effort to decrease the probability of passing up profitable oil or gas bearing formations. While a number of the heretofore known methods and apparatuses have been found useful in giving an indication of the presence of oil bearing formations, so far as is known there has not heretofore been provided any method of obtaining, by a well bore logging method or apparatus, an indication as to whether the oil or gas contained in a hydrocarbon bearing formation is displaceable, and therefore recoverable.

Accordingly, it is the purpose of this invention to provide a method of investigating subterranean formations for the existence therein of displaceable hydrocarbons.

It is a further object of this invention to provide a method for examining subterranean formations penetrated by a borehole for the presence therein of displaceable hydrocarbons.

It is a further object of this invention to provide a method for measuring the apparent specific electrical resistivity of a plurality of radially contiguous increments of formations penetrated by a borehole, whereby to determine whether or not said formations contain flowable hydrocarbons.

A still further object of this invention is to provide a method for determining the existence of recoverable hydrocarbons in a formation penetrated by a borehole drilled using a drilling fluid having a filtrate of higher resistivity than the formation connate water, which method comprises establishing an electrical field in the formation in the vicinity of the borehole either by the direct input of current or by induction, and thereafter measuring the specific resistivities of a plurality of radial increments of the formation extending through and beyond the portion of the formation affected by the invasion of the mud filtrate.

Other objects and advantages of the present invention will become apparent from the detailed explanation contained in the specification and accompanying drawings.

Figures 1, 2, 3:
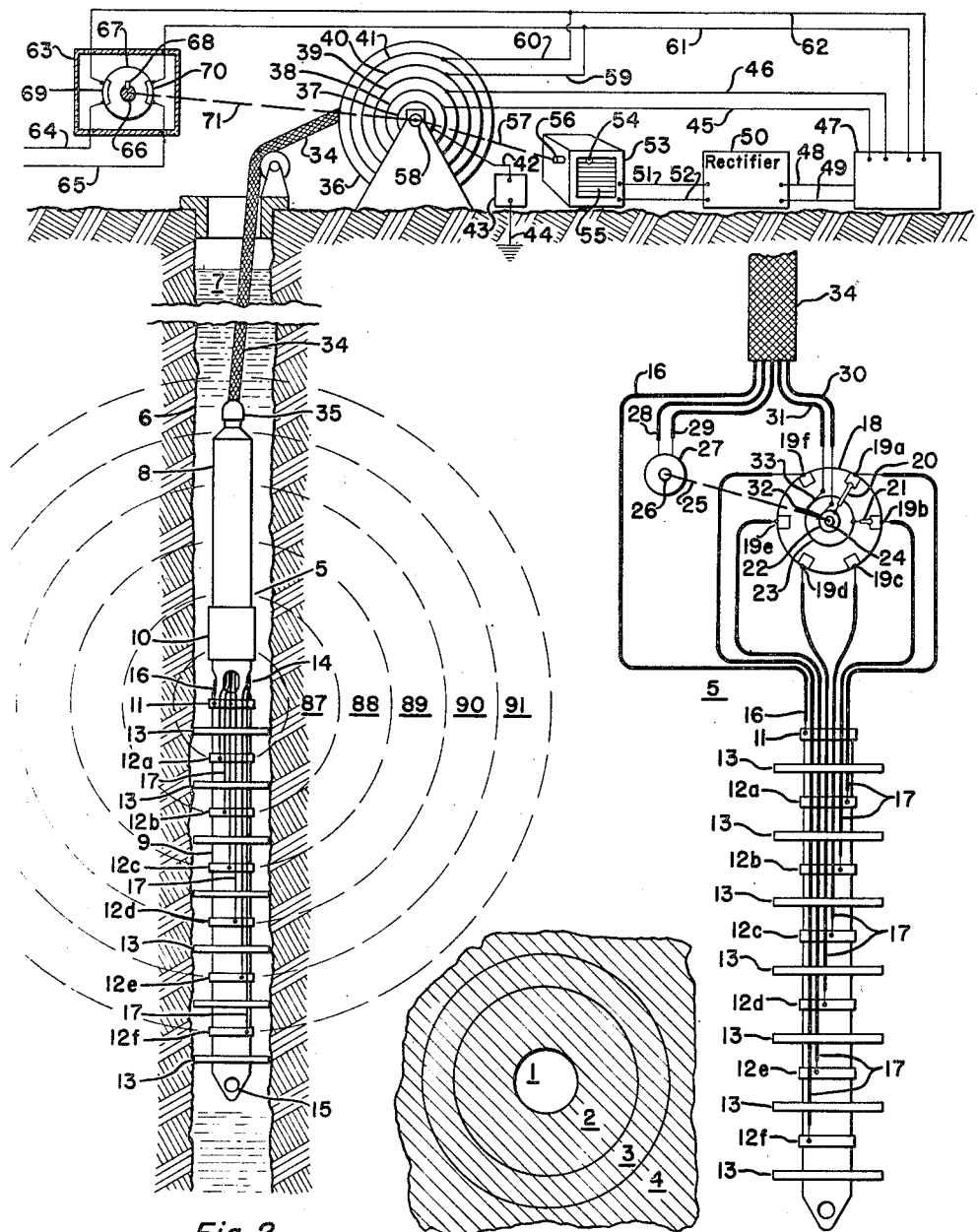
Figure 1 is a diagrammatic representation of a borehole and the immediately surrounding portion of the penetrated formation, which has been assumed to be a formation containing displaceable hydrocarbons.
Figure 2 is a representation of a well penetrating subterranean formations, with a preferred embodiment of an apparatus for carrying out the present invention schematically represented in connection therewith.
Figure 3 is a schematic representation of the borehole instrument of the apparatus of Figure 2, particularly showing the means for selectively connecting surface equipment with terminals connected to electrodes installed on the borehole instrument.

This invention is based upon the fact that upon drilling through a formation containing displaceable hydrocarbons accompanied by connate water of relatively low resistivity compared to the filtrate of the mud used in drilling, the mud filtrate enters the formation in the vicinity of the borehole and forces formation fluid back away from the borehole a short distance into the formation. If the formation contains hydrocarbons which are displaceable by the mud filtrate, a measure of the specific resistivity of the formation as a function of radial distance from the borehole results in the finding of a first zone (containing essentially the mud filtrate, plus irreducible hydrocarbons) of relatively high resistivity in the radial increment of the formation immediately surrounding the borehole where the mud filtrate has entered the formation, a second zone of relatively low resistivity in a relatively narrow radial increment outwardly adjacent to the first zone, the fluid in said second zone comprising, in addition to irreducible hydrocarbons, substantially the low resistivity formation water which was originally contained in the first zone but which was swept out by the invading mud filtrate and piled into a bank of water of low resistivity at the leading edge of the first zone, and a third zone of relatively high resistivity outwardly adjacent to the second zone, the fluid in said third zone being substantially identical to that in the formation under virgin conditions.

In view of the above, it will be appreciated by those skilled in the art of making electrical determinations relative to subterranean formations that whenever the measurement of formation specific resistivity as a function of radial distance from a borehole penetrating the formation reveals a zone of highly resistivity followed by an outwardly adjacent zone of low resistivity followed, in turn, by another zone of relatively high resistivity, the presence of displaceable oil accompanied by connate water in the formation is probably indicated. For instance, this peculiar relationship between formation resistivity and radial distance from the borehole will not obtain if the formation originally contained salt water either alone or accompanied by irreducible hydrocarbons, since in such case there would be an indication of relatively high resistivity in the radial zone adjacent the borehole, which zone would be filled principally with mud filtrate, and an indication of low resistivity both in the second zone and in the third zone since both of such zones would be filled with the low resistance formation salt water with or without irreducible hydrocarbons.

In essence, therefore, the present invention comprises a method of, and apparatus for, determining the existence of displaceable oil in formations penetrated by a borehole by determining the variation of specific resistivity of the formations as a function of lateral distance from the borehole after said formations have been invaded by filtrate from the drilling fluid used in drilling the borehole.

The theory of this invention will best be understood with reference to Figure 1. In this figure, the numeral 1 refers to a borehole which has been drilled through a formation 2—3—4, which, for the purpose of this explanation, will be assumed to be a formation originally containing displaceable oil accompanied by saline irreducible water. Further, it will be assumed that borehole 1 was drilled using a drilling fluid, the filtrate of which had an electrical resistivity considerably higher than the resistivity of connate water which is normally found in oil bearing formations.

It will be appreciated by those skilled in the art that when a borehole is drilled through a porous formation using a weighted drilling fluid, or mud, as is customary in the rotary method of drilling, filtrate from the drilling fluid invades the formation in the vicinity of the borehole, thereby displacing back into the formation a portion of the indigenous formation fluid. In Figure 1, zone 2 of the formations 2—3—4 represents the zone of the formation immediately surrounding borehole 1 in which the formation fluid has been substantially displaced by the invading filtrate.

It will be understood by those familiar with the flow characteristics of porous formations that the relative permeability of such formations to oil and water is dependent, in large measure, on the saturation, above residual saturation, at which these phases respectively exist in the formations. By residual saturation is meant that saturation at which flow of the phase in the formation first becomes possible. Generally speaking, therefore, a formation which contains a high proportion of oil to water is more permeable to oil than water. In the case of formation 2—3—4, as mentioned hereinabove, this formation is assumed to be one having substantially its entire pore volume filled with oil accompanied only by irreducible water. Thus, in the virgin state of the formation oil could flow freely through the formation upon the application of a pressure differential, whereas there would be no tendency for the irreducible water to flow. Therefore, the first effect of the pressure of the mud filtrate, as borehole 1 was drilled through the formation, was to displace the oil from the invaded zone. Immediately the oil was displaced, however, the water-to-oil ratio in the increment of the formation invaded by the filtrate was increased; so that this increment of the formation then became permeable to water. Under such condition, the irreducible connate water of the formation which, in the virgin state of the reservoir, was not subject to flow because of the unfavorable water-to-oil permeability ratio, also became subject to displacement by the invading mud filtrate.

Thus, as the mud filtrate invaded farther and farther into the formation it pushed the easily displaceable oil back into the formation radially away from the borehole and, at the same time, built up a bank of less easily movable formation water immediately in advance of the invading front. Under such condition, therefore, it will be understood that the pores of zone 2 of the formation 2—3—4 became substantially filled with the high-resistivity mud filtrate, zone 3 became substantially filled with the relatively low-resistivity formation water, while the fluid of zone 4 remained substantially identical to the fluid as it existed in the virgin formation; that is, zone 4 remained filled with oil accompanied by irreducible formation water. Therefore, a measure of the specific resistivity of the formation 2—3—4 as a function of distance from the borehole would show the specific resistivity of zone 2 to be relatively high, the specific resistivity of zone 3 to be relatively low, and the specific resistivity of zone 4 to be relatively higher than that of zone 3.

Having an understanding of the above theory, it will be appreciated by those skilled in the art that the existence of displaceable oil in subterranean formations may be determined by drilling a borehole through said formations using a drilling mud the filtrate of which has a resistivity considerably higher than the resistivity of water normally found in oil bearing formations, and thereafter measuring the specific resistivity of the formations as a function of radial distance from the borehole. In general, this method contemplates the use of a drilling mud having a filtrate with a resistivity of between 0.5 and 2 ohmmeters, and preferably of about 1 ohm-meter (measured at 68° F.), although one having a filtrate of higher or lower resistivity may be occasionally employed depending upon the known or anticipated resistivity characteristics of connate water in a particular area or formation being explored.

It has been known in the past to measure the specific resistivity of a formation at one radial distance from a borehole, as for instance disclosed in the patent to Conrad Schlumberger, No. 1,819,923, issued August 13, 1931. It has also been proposed to determine the specific resistivity of a first radial increment of the formation closely adjacent the borehole and also of a second radial increment spaced at a greater distance from the borehole, as, for instance, disclosed in reissue Patent No. Re. 21,832, issued June 17, 1941, to Frederick W. Huber.

However, the prior known methods and apparatuses of electrical logging, as illustrated by the two above patents, would not prove useful in locating formations containing displaceable oil in accordance with the method of this invention since it is necessary that the specific resistivity of at least three radial increments of the formations be determined. That is, again referring to Figure 1 for the purpose of illustration, there must be at least one measurement made in each of the three zones 2, 3, and 4 in order to determine whether the specific resistivity of zone 3 is lower than the specific resistivities of zones 2 and 4. While, theoretically, three measurements should be sufficient to determine whether or not there is an anomalous zone of low specific resistivity at a distance displaced radially from the borehole, it has been found that as a practical matter specific resistivity must be measured at many more than three radial distances from the borehole, because of the high degree of improbability of making each of the three measurements at precisely the correct radial distance to insure that one is made in each of the three zones. Thus, it has been found experimentally that formations containing displaceable hydrocarbons may be found in accordance with this method with an accuracy of only about 10% by a determination of the specific resistivities of three radially contiguous increments of the formation, whereas the percentage accuracy of the method may be increased to about 70% when such determination is made for as many as twelve such radially contiguous increments. To insure reasonable accuracy, therefore, it is preferred to make determinations of the specific resistivities of between five and twelve radially contiguous increments of the formation. Preferably the innermost of said radially contiguous increments is adjacent the borehole, at least the outermost one is sufficiently beyond the radius to which mud filtrate may normally be expected to penetrate the formation so that the specific resistivity of said outermost increment will be representative of the specific resistivity of the virgin formation, and the remainder of the increments are substantially equally spaced between said innermost and outermost increments. In general, reliable results may be obtained by determining the specific resistivity of one increment radially adjacent the borehole, another increment spaced about five feet radially from the borehole, and from three to ten substantially equal contiguous intermediate increments.

In Figure 2 there is shown one type of apparatus which has been found suitable for making the determinations of specific resistivity at a plurality of radial distances from a borehole in accordance with the principles of this invention. In this figure, sonde 5 is shown located in borehole 6 filled with an electrically conductive fluid 7. Sonde 5 consists of an upper housing 8, containing switching means as shown more clearly in Figure 3, and a lower section 9 connected by coupling member 10. Housing 8 may be made of any desired material although a non-corrosive material, such as stainless steel, is to be preferred. Lower section 9 is made of a non-conducting material, such as Bakelite.

A current electrode 11, which preferably comprises a band of non-corrosive metal, such as stainless steel, is secured to lower section 9 near the top thereof. A plurality of potential electrodes 12a, 12b, 12c, 12d, 12e, and 12f, which also preferably comprise bands of non-corrosive metal, are also secured to lower section 9 at substantially equally spaced intervals below current electrode 11. Rings 13, which are of an outside diameter substantially equal to the diameter of borehole 6, are secured to lower section 9 between current electrode 11 and upper potential electrode 12a and also between each pair of potential electrodes. Rings 13 are made of an insulating material, preferably rubber or a similar flexible material, and their purpose is to reduce to a minimum the path for current flow through the borehole and thus eliminate, insofar as possible, the short circuiting of the several electrodes by the conductive fluid 7 in the borehole. Lower section 9 is preferably hollow, and has holes 14 and 15 at the top and bottom thereof, respectively, to permit fluid 7 to pass therethrough as sonde 5 is moved through the borehole.

Current electrode lead wire 16, and potential electrode lead wires 17, which pass through a packing gland, not shown, in the lower end of upper housing 8, and thence outwardly through one of the holes 14 in lower section 9, are secured to current electrode 11 and to the potential electrodes, respectively.

In Figure 3, the borehole instrument 5 is shown in more detail, housing 8 and coupling member 10 being omitted for the sake of clarity, and the switching means contained in housing 8 being shown schematically. It will be seen that this switching means comprises a multi-contact switch 18 having a plurality of fixed contacts 19a, 19b, 19c, 19d, 19e, and 19f, and a pair of movable contacts 20 and 21. Movable contact 20 is connected to slip ring 22 and movable contact 21 is connected to slip ring 23, both of which slip rings are mounted on, but insulated from, shaft 24 in any suitable manner and adapted to be rotated therewith. As shown, movable contacts 20 and 21 are arranged by their angular spacing with respect to each other, so that they may each, respectively, engage one of an adjacent pair of the fixed contacts.

Shaft 24 of multi-contact switch 18 is coupled in any suitable manner, as schematically represented by coupling 25, to shaft 26 of switch rotating mechanism or motor 27. Switch rotating mechanism, or motor 27 may be of the type well known to those familiar with switching mechanisms, in which the armature, not shown, secured to shaft 26 is adapted to be rotated through a predetermined arc upon the application of a pulse of electric current through wires 28 and 29 which supply the stator coil, not shown, of motor 27. The amount of rotation of shaft 26 upon the occurrence of each pulse of current through wires 28 and 29 is such that shaft 24 of multi-contact switch 18 will be rotated, through the medium of coupling 25, through an angle the size of which is dependent upon the number of fixed contacts. For example, in the embodiment shown, there being six fixed contacts, each impulse of current through wires 28 causes shaft 24 to rotate through ⅙ of a complete turn. It will be appreciated, therefore, that movable contacts 20 and 21, which are mounted on shaft 24, will be moved from contact with one adjacent pair of fixed contacts, for instance 19a and 19b, to the next adjacent pair of fixed contacts, for instance 19b and 19c, upon the occurrence of each pulse of current delivered through wires 28 and 29 to switch driving mechanism 27.

Slip rings 22 and 23, to which movable contacts 20 and 21 are respectively connected, are in turn connected with wires 30 and 31, respectively, through brushes 32 and 33.

Wires 16, 28, 29, 30, and 31 comprise the conductors of multi-conductor insulated cable 34 which, as more clearly shown in Figure 2, passes through the top of upper housing 8 of sonde 5, having a watertight connection therewith, as for instance by means of any suitable packing gland 35. Cable 34 passes through borehole 6 to the surface of the earth where it is wound on reel 36 which is adapted to be rotated by a power source, not shown, to lower and raise sonde 5 through the borehole. Reel 36 is provided with a plurality of slip rings 37, 38, 39, 40, and 41 to which wires 16, 30, 31, 28, and 29 are respectively connected by any suitable means, as for instance by soldering.

Slip ring 37 is connected, as for instance by a suitable brush, to wire 42 which is connected to one side of alternating current source 43, the other side of which is grounded as for instance at 44.

Slip rings 38 and 39 are connected as for instance by suitable brushes to lead wires 45 and 46 which are connected, as will be more fully explained hereinafter, to compensating potentiometer 47 which is in turn connected as by wires 48 and 49, to rectifier 50. Signals received by rectifier 50 through wires 48 and 49 are, after rectification, adapted to be passed through wires 51 and 52 to recorder 53, which is preferably a recording potentiometer of any suitable type known to those skilled in the art of recording apparatus, having a stylus 54 and a movable chart 55. The chart-driving means 56 of recorder 53 is preferably coupled, as for instance by gearing or belt drive, not shown, as schematically indicated by coupling 57, to shaft 58 of reel 36; whereby the movement of shaft 58 will be synchronized with the rotation of reel 36 as it is rotated to raise and lower sonde 5 in borehole 6.

Slip rings 40 and 41 are connected by suitable brushes to wires 59 and 60, respectively, which are in turn connected with wires 61 and 62 of electrical switch device 63. Also connected to switch device 63 are wires 64 and 65 across which there is a continuous electrical potential from a source not shown. Device 63 may be a switch of any suitable type adaptable to apply the potential existing across wires 64 and 65 to wires 61 and 62 intermittently upon rotation of a switch actuator, such as shaft 66. For example, in the embodiment shown in Figure 2, switch device 63 comprises a drum 67 of any suitable non-conducting material, such as fiber, which is keyed to shaft 66, as for instance by key 68, and having conducting strips 69 and 70 on the periphery thereof for intermittently establishing contact between wires 62 and 64 and wires 61 and 65, respectively, as shaft 66 is rotated. Shaft 66 is preferably coupled, by any convenient means, such as gearing or belt drive, not shown, as schematically represented in Figure 2 by coupling 71, to shaft 58 of reel 36, whereby the rotation of reel 36, as it is rotated to raise and lower sonde 5 in borehole 6, will be effective to cause switch device 63 to intermittently apply across wires 61—62 the voltage existing across wires 64—65.

Figure 4:
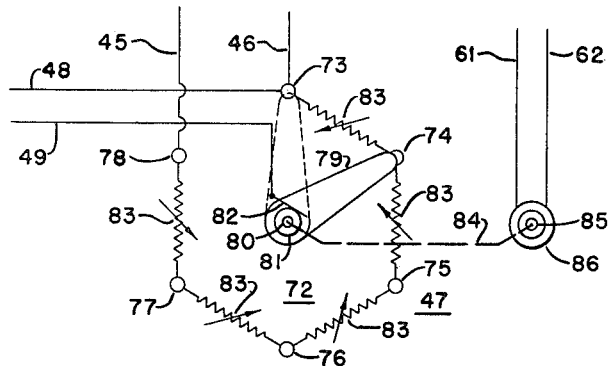
Figure 4 is a schematic representation of compensating means whereby signals received from the borehole instrument are calibrated, as will be hereinafter explained, before transmission to the recording equipment.

Referring now more particularly to Figure 4, it will be seen that the compensating potentiometer 47 provides means whereby a portion, or all, of the voltage appearing across wires 45—46 may be selectively applied to wires 48—49. Compensating potentiometer 47 comprises a switch, generally designated by the numeral 72, having a plurality of fixed contacts 73, 74, 75, 76, 77, and 78 and a movable contact 79 which is rotatably mounted, as for instance on shaft 80, whereby it may be rotated to selectively contact one of the fixed contacts. Movable contact 79 has secured thereto slip ring 81 which is adapted to be contacted by brush 82 to which is secured wire 49. Variable resistances 83 are connected between each adjacent pair of fixed contacts 73—74, 74—75, etc. Since wires 46 and 48 are both connected with fixed contact 73, wire 45 is connected with fixed contact 78, and wire 49 is connected with movable contact 79, it will be appreciated that the proportion of voltage appearing across wires 45—46 which it is desired to apply to wires 48—49 may be controlled by the position of movable contact 79. Thus, when movable contact 79 is in contact with fixed contact 73, as indicated by the dotted line position of movable contact 79 in Figure 4, no portion of any voltage appearing across wires 45—46 will appear across wires 48—49; and when movable contact 79 is in the full line position, as shown in Figure 4, whereby it is in contact with fixed contact 74, the voltage appearing across wires 48—49 will be a proportion of the total voltage appearing across wires 45—46 equal to the ratio which the variable resistance 83 between fixed contacts 73—74 bears to the entire sum of the resistances between the several pairs of fixed contacts. It will be appreciated by those familiar with electrical phenomena that the ratio of voltage across wires 48—49 to the voltage across wires 45—46 may be increased step by step by rotating movable contact 79 clockwise from one fixed contact to the next until it is in contact with fixed contact 78, at which time the voltage across wires 48—49 will be equal to the voltage across wires 45—46.

Shaft 80, upon which movable contact 79 is mounted, is preferably coupled in any suitable manner, such as gearing or belt drive, not shown, as schematically represented by coupling 84, to shaft 85 of switch rotating mechanism, or motor, 86, which is preferably similar to, or identical to, switch rotating mechanism 27, described above. The stator coil, not shown, of motor 86 is adapted to be supplied with current through wires 61—62 which, with reference to Figure 2, will be seen are connected with switch device 63.

In operation, sonde 5 is adapted to be lowered to the bottom of a borehole 6 which is filled with a conductive fluid 7. An alternating current of constant frequency and amplitude, generated by current source 43, which is preferably a square wave generator, is caused to flow between ground electrode 44 and borehole current electrode 11. With current flowing continuously between electrodes 11 and 44, sonde 5 is raised through borehole 6, as for instance by clockwise rotation of reel 36. As reel 36 is rotated, shaft 66, which is coupled thereto by coupling 71, is likewise rotated, whereby voltage is intermittently applied to wires 61—62, as explained above. This voltage across wires 61—62 is transmitted through wires 59 and 60, slip rings 40 and 41, and wires 28 and 29 to switch rotating mechanism 27 in the upper section 8 of sonde 5. Shaft 26 of switch rotating mechanism 27 is adapted to be rotated ⅛ of a turn in a clockwise direction upon the delivery of each pulse of current through wires 28—29. Thus movable contacts 20—21 which, it will be assumed, are initially in contact with fixed contacts 19a and 19b, respectively, will be intermittently shifted ⅛ of a turn in a clockwise direction as shaft 26 of switch rotating mechanism 27 is so rotated. Preferably, coupling 71 between shaft 58 and shaft 66 is such that shaft 26 of switch rotating mechanism 27 will be caused to rotate through one complete turn as sonde 5 is moved through a distance of one foot in borehole 6. Therefore, when sonde 5 is moved upwardly through borehole 6 a distance of one foot there is applied to wires 30 and 31 in rapid succession a series of voltages equal, respectively, to the difference in potential between electrodes 12a and 12b, 12b and 12c, 12c and 12d, 12d and 12e, and 12e and 12f.

It will be appreciated by those skilled in the art that the potential measured between potential electrodes 12a and 12b due to the flow of current between electrodes 11 and 44 is roughly equivalent to the drop in potential across radial increment 87 of the formation which is momentarily adjacent electrode 11. Likewise, the potential between electrodes 12b and 12c is roughly equivalent to the potential across radial increment 88 of the formation which is momentarily adjacent electrode 11, etc. Therefore, the voltages applied to wires 30—31 successively, as switch rotating mechanism 27 is rotated, represent the approximate voltages which exist substantially simultaneously across radially contiguous increments 87, 88, 89, 90, and 91, respectively, of the formation in the vicinity of current electrode 11 due to current flowing between electrodes 11 and 44.

The successive voltages applied to wires 30 and 31 are applied through slip rings 38—39, and wires 45—46 to compensating potentiometer 47, the purpose of which is to compensate for the difference in current density in the several radially contiguous increments of the formation in the vicinity of electrode 11. In this connection, it will be appreciated by those skilled in the art that current density will be greatest in the immediate vicinity of current electrode 11 and will decrease with an increase in distance therefrom. Therefore, the potential drop across a radial increment of a given thickness will be much greater in the case of an increment close to the potential electrode as compared to an increment at a greater distance therefrom. For example, it will be appreciated that although the specific resistivity of radial increment 91 may be exactly equal to the specific resistivity of radial increment 87, the measured potential drop across the former increment will be only a fraction of the measured potential drop across the latter due to the difference in current density.

In order that the voltages supplied to rectifier 50 and thence to recorder 53 may be proportional to the specific resistivities of the several radially contiguous increments 87, 88, 89, 90, and 91, rather than to the actual voltage drop thereacross, compensating potentiometer 47 provides means whereby the differences in current densities in the several radial increments may be compensated for. Thus, it will be seen that switch 72 with the several variable resistances 83 connected between its fixed contacts 73–74, 74–75, etc. comprises a voltage divider by means of which, through movement of movable contact 79, either all, or a selected portion, of the voltage applied across contacts 73 and 78 by wires 45 and 46 may be applied across wires 48–49. It will be noted that switch rotating mechanism 86, which is coupled with movable contact 79 is supplied with operating voltage through wires 61 and 62 which also supply the operating voltage to the switch rotating mechanism 27 for movable contacts 20 and 21 of switch 18. Thus, movement of movable contact 79 is synchronized with movement of movable contacts 20 and 21, and the two switches are so adjusted that movable contact 79 is in contact with fixed contact 74 when movable contacts 20 and 21 are in contact with fixed contacts 19a and 19b, respectively. Thus, when the voltage applied across contacts 73 and 78 is that measured by potential electrodes 19a and 19b across increment 87, where current density is greatest, the voltage applied across wires 48—49 is only that portion of the total which the resistance between contacts 73–74 bears to the total resistance between contacts 73 and 78. Then, as contacts 20 and 21 are rotated to successively measure the voltage across increments 88, 89, etc., in which the current densities become increasingly less, contact 79 is simultaneously rotated whereby to apply to wires 48–49 an increasingly larger proportion of the voltage applied through wires 45–46 to contacts 73 and 78.

The values of variable resistances 83 may be adjusted, as will be appreciated by those skilled in the art of electrical logging, by placing sonde 5 in a homogeneous medium, such as a body of water, passing current between current electrode 11 and remote ground electrode 44, rotating movable contacts 20 and 21 of switch 18 and movable contact 79 of switch 72 in synchronism, and individually adjusting the several variable resistances 83 so that the voltage across wires 48 and 49 is the same regardless of which pair of adjacent potential electrodes on the sonde are connected, through switch 18, wires 30 and 31, slip rings 38 and 39, and wires 45 and 46, to contacts 73—78 of switch 72.

As shown in Figure 2, wires 48 and 49 are connected to rectifier 50, which may be of any type known to those skilled in the art, for converting the alternating current voltages applied through wires 48 and 49 to direct current voltages. The output of rectifier 50 is supplied through wires 51 and 52 to recorder 53 in such manner, as is known to those familiar with recording instruments, as to cause stylus 54 to assume a position on chart 55 in accordance with the voltage existing across wires 51 and 52. Since, as has been pointed out hereinbefore, chart driving means 56 is coupled to shaft 58 of reel 36, the position of stylus 54 at any instant may be coordinated with the depth of sonde 5 in borehole 6.

Figure 5:
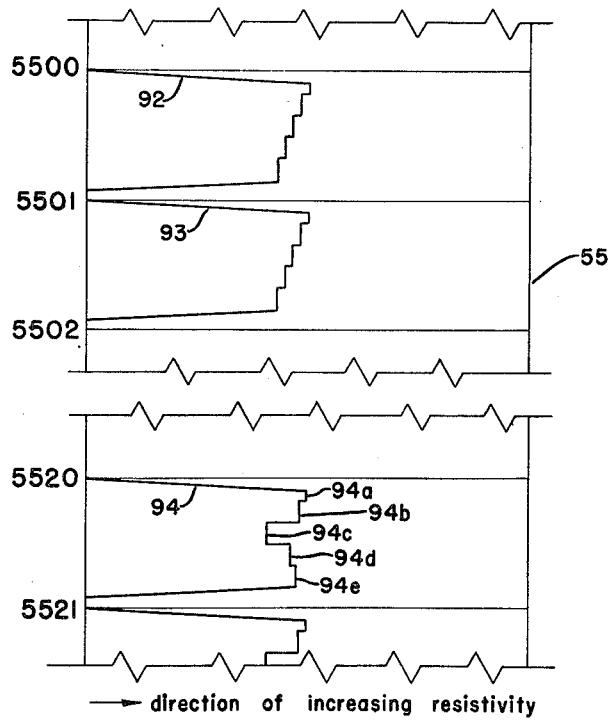
Figure 5 represents a portion of a recording chart which might be obtained by apparatus of the present invention.

In Figure 5 there is shown a section of chart 55 upon which curves 92, 93, and 94 indicate the specific resistivities, as a function of distance from the borehole, of sections of subterranean formations one foot thick at levels of 5500, 5501, 5520, respectively. In the case of curve 94, that portion of the curve indicated at 94a represents the specific resistivity of the radial increment of the formation, at level 5520 feet, which is closest to the borehole; that is, it represents the measurement made when movable contacts 20 and 21 of switch 18 were connected across potential electrodes 12a and 12b. Likewise, those portions of curve 94 marked 94b, 94c, 94d, and 94e represent the specific resistivities of successively more remote radially contiguous increments of the formation as indicated by measurements made when movable contacts 20 and 21 were connected across potential electrodes 12b and 12c, 12c and 12d, 12d and 12e, and 12e and 12f, respectively.

From observation of curve 94 it is obvious that there is a zone of relatively high specific resistivity in the first two radial increments for which the specific resistivity was determined, a zone of relatively low resistivity in the third outlying radial increment, and a zone of higher relative resistivity in the fourth and fifth. As pointed out earlier in this specification, such a condition is indicative of the presence of movable hydrocarbons. Observing curves 92 and 93, on the other hand, it is seen that the specific resistivities of the several radial increments decrease somewhat with increased distance from the borehole, thereby indicating a formation which probably contains saline water to the exclusion of any substantial amount of displaceable hydrocarbons.

To facilitate the description of the construction and operation of the above apparatus, it has been shown and described as having only six potential electrodes, whereby measurement may be made of the specific resistivity of five radially contiguous increments of the formations traversed. However, it will be obvious to those skilled in the art that a greater number of potential electrodes may be employed if desired, and that the accuracy of this method of locating displaceable hydrocarbons will be increased by employing a greater number of potential electrodes at closer spacing. The essential requirement is that the apparatus be adapted to measure the specific resistivity of a plurality of contiguous radial increments of relatively small thickness extending adjacent to the borehole through and beyond the invaded zone into the zone of the formation which is substantially unaffected by invasion. Theoretically, it is desirable to determine the specific resistivity continuously as a function of distance from the borehole, but practically, this is impossible. Actually, it has been found that sufficiently reliable results may be obtained by measurements made between probes spaced about 4 to 8 inches apart between the borehole current electrode and a point about five (5) feet therefrom.

It will be appreciated by those skilled in the art that due to leakage of current through the borehole, heterogeneities in the formation, and many other factors, it is a practical impossibility to determine accurately the specific resistivity of formations or increments thereof from electrical measurements made in the borehole. Therefore, wherever the term "specific resistivity" is used throughout the specification and claims it will be understood to mean the apparent specific resistivity as obtained through borehole electrical measurements. Also, it will be appreciated that the several radially contiguous increments for which the apparent specific resistivities are determined are not precisely spherical nor equal in width to the spacing between the corresponding pairs of potential electrodes, as was assumed for the purpose of more clearly explaining this invention. However, this fact is not seriously detrimental to the accuracy of this method of finding displaceable hydrocarbons, since the method requires only the determination of the variation in specific resistivity, or apparent specific resistivity, of the formations as a function of distance from the borehole, and such determination does not require that the several radially contiguous increments be precisely equal in width and equally spaced. However, it is preferable to measure substantially simultaneously the specific resistivities of the several radially contiguous increments at each level in the well rather than running a plurality of independent resistivity logs for different radial distances from the borehole and then attempting to coordinate the several independent logs to determine the variation of specific resistivity as a function of distance from the borehole. Obviously, in the latter case errors might easily occur in coordinating the several independent logs as to depth; and also inaccuracies might likely occur due to changes in resistivity of the borehole fluid or in the electrical characteristics of the logging and measuring circuit between successive logging runs.

While the above described apparatus represents one specific type of apparatus useful in determining the apparent specific resistivity of a plurality of radially contiguous increments of formations penetrated by a borehole, it will be appreciated by those skilled in the art that other types of systems may be employed for a like purpose. For example, the apparent specific resistivities of a plurality of radial increments of a formation may be determined by the induction logging method disclosed in Patent No. 2,582,315 to Henri-Georges Doll in which a multiple transmitter-coil system is employed to control lateral distance from the borehole at which the sensitivity of the system is at a maximum and thereby to make possible the determination of the apparent specific resistivity of the formation at said lateral distance.

Likewise, in an article entitled "The shielded electrode method," by Hubert Guyod, pages 134–144, World Oil, December 1951, there is described a system in which the lateral penetration of current from a borehole electrode into a formation penetrated by a borehole may be controlled by varying the length of so-called "electrode shields" whereby to make possible the determination of the apparent specific resistivity of that portion of the formation penetrated by the current. Also, in a paper entitled "The Laterolog: a new resistivity logging method with electrodes using an automatic focusing system," pages 305–316, Journal of Petroleum Technology, November 1951, H. G. Doll discloses a system employing so-called "focusing electrodes" to control the lateral penetration into the formation of current from a borehole electrode. By adjustment of the focusing electrodes as described in the paper, current from a borehole current electrode may be caused to penetrate a formation to any desired lateral distance from the borehole whereby to make possible the determination of the apparent specific resistivity of the formation in the area penetrated by said current.

Thus, while there have been described and shown preferred method and apparatus for determining the existence in subterranean formations of displaceable hydrocarbons by measuring the apparent electrical resistance of radially contiguous increments of the formations, it will be appreciated by those skilled in the art that many variations may be made in the methods and apparatus for making the required specific resistivity determinations without departing from the spirit and scope of the invention as claimed.

We claim:

1. A method of investigating earth formations traversed by a bore hole and the fluids contained therein comprising the steps of establishing in said bore hole a body of electrically conductive liquid having a conductivity lower than the conductivity of naturally-occurring formation waters, maintaining, at the wall of said bore hole, the pressure of said conductive liquid in excess of the pressure of naturally-occurring formation fluids for a time sufficient to cause a portion of said conductive fluid to enter said formations, and obtaining at least one individual indication that is primarily a function of the resistivity of said formations and the fluids contained therein in each of three zones of said formations laterally displaced one from the other and displaced outwardly from the wall of said bore hole, said zones including a first zone containing that portion of said conductive liquid which has entered said formations, a second zone containing naturally-occurring formation fluids in substantially their virgin state and a third zone intermediate said first and said second zones.

2. A method in accordance with claim 1 wherein the conductivity of the conductive fluid is less than 2 mhos.

3. A method in accordance with claim 1 wherein the conductivity of the conductive fluid is between 2 and 0.5 mhos.

4. A method in accordance with claim 1 wherein the conductive fluid is a weighted fluid employed in the rotary drilling of the bore hole.

5. A method in accordance with claim 1 wherein the first zone is adjacent the wall of the bore hole, the second zone is about five feet from the wall of the borehole and the third zone is outwardly beyond and adjacent to the outward extremity of that portion of the formations which has been entered by the conductive fluid.

6. A method of investigating earth formations traversed by a bore hole and the fluids contained therein comprising the steps of establishing in said bore hole a body of electrically conductive liquid having a conductivity lower than the conductivity of naturally-occurring formation waters, maintaining, at the wall of said bore hole, the pressure of said conductive liquid in excess of the pressure of naturally-occurring formation fluids for a time sufficient to cause a portion of said conductive fluid to enter said formations, and obtaining, at each of a plurality of different depths in said bore hole, at least one individual indication that is primarily a function of the resistivity of said formations and the fluids contained therein in each of three zones of said formations laterally displaced one from the other and displaced outwardly from the wall of said bore hole, said zones including a first zone containing that portion of said conductive liquid which has entered said formations, a second zone containing naturally-occurring formation fluids in substantially their virgin state and a third zone intermediate said first and said second zones.

7. A method of investigating earth formations traversed by a bore hole and the fluids contained therein comprising the steps of establishing in said bore hole a body of electrically conductive liquid having a conductivity lower than the conductivity of naturally-occurring formation waters, maintaining, at the wall of said bore hole, the pressure of said conductive liquid in excess of the pressure of naturally-occurring formation fluids for a time sufficient to cause a portion of said conductive fluid to enter said formations, and obtaining at least one individual indication that is primarily a function of the resistivity of an annular segment of said formations having a lateral dimension of four to eight inches and the fluids contained therein in each of three zones of said formations laterally displaced one from the other and displaced outwardly from the wall of said bore hole, said zones including a first zone containing that portion of said conductive liquid which has entered said formations, a second zone containing naturally-occurring formation fluids in substantially their virgin state and a third zone intermediate said first and said second zones.

8. A method of investigating earth formations traversed by a bore hole and the fluids contained therein comprising the steps of establishing in said bore hole a body of electrically conductive liquid having a conductivity lower than the conductivity of naturally-occurring formation waters, maintaining, at the wall of said bore hole, the pressure of said conductive liquid in excess of the pressure of naturally-occurring formation fluids for a time sufficient to cause a portion of said conductive liquid to enter said formations, establishing an electrical field in said formations, obtaining, at not less than three receiving points in said bore hole each of which are spaced successively greater distances from the source of said electrical field, individual indications which are primarily a function of the resistivity of said formations and the fluids contained therein, and, simultaneously with the steps of establishing an electrical field and obtaining indications which are primarily a function of resistivity, substantially eliminating in the vicinity of said receiving points the flow of electrical energy through said body of conductive liquid in said bore hole in a direction which is parallel to the direction of flow of electrical energy through said formations immediately adjacent the wall of said borehole.

9. A method in accordance with claim 8 wherein one of the receiving points is spaced a distance of four to eight inches from the source of the electrical field and the remainder of said receiving points are each spaced a distance of four to eight inches from the next preceding receiving point.

10. A method in accordance with claim 9 wherein the receiving points are 5 to 12 in number.

11. A method in accordance with claim 8 wherein the conductivity of the fluid is less than 2 mhos.

12. A method in accordance with claim 8 wherein the conductivity of the conductive fluid is between 2 and 0.5 mhos.

13. A method in accordance with claim 8 wherein the conductive fluid is a weighted fluid employed in the rotary drilling of the bore hole.

References Cited in the file of this patent

UNITED STATES PATENTS

| | | |
|---|---|---|
| Re. 21,832 | Huber | June 17, 1941 |
| 2,206,892 | Hawley | July 9, 1940 |
| 2,393,009 | Chun | Jan. 15, 1946 |
| 2,562,992 | Schlumberger | Aug. 7, 1951 |
| 2,617,852 | Waters | Nov. 11, 1952 |
| 2,669,690 | Doll | Feb. 16, 1954 |
| 2,712,630 | Doll | July 5, 1955 |